United States Patent [19]
Anderson

[11] Patent Number: 4,787,352
[45] Date of Patent: Nov. 29, 1988

[54] ENGINE CONTROL CIRCUIT INCLUDING SPEED MONITOR AND GOVERNOR

[75] Inventor: George Anderson, Rockford, Ill.

[73] Assignee: Barber-Coleman Company, Rockford, Ill.

[21] Appl. No.: 82,525

[22] Filed: Aug. 6, 1987

[51] Int. Cl.$^4$ .................. F02D 17/04; F02D 31/00
[52] U.S. Cl. .................. 123/352; 123/179 B; 123/359
[58] Field of Search .......... 123/359, 479, 339, 352, 123/357, 362, 179 B, 179 G, 179 L, 198 DB, 198 DC, 333, 335

[56] References Cited

U.S. PATENT DOCUMENTS

| | | | |
|---|---|---|---|
| 4,279,229 | 7/1981 | Arnold et al. | 123/357 X |
| 4,441,471 | 4/1984 | Krah et al. | 123/339 |
| 4,491,112 | 1/1985 | Kanegae | 123/359 |
| 4,513,711 | 4/1985 | Braun et al. | 123/352 X |
| 4,520,779 | 6/1985 | Kubach | 123/352 X |
| 4,554,899 | 11/1985 | Engel et al. | 123/339 X |
| 4,572,125 | 2/1986 | Kratt | 123/339 X |

FOREIGN PATENT DOCUMENTS

| | | | |
|---|---|---|---|
| 59-213935 | 3/1984 | Japan | 123/359 |
| 60-142033 | 7/1985 | Japan | 123/359 |
| 2105067 | 9/1981 | United Kingdom | 123/359 |

Primary Examiner—Willis R. Wolfe
Attorney, Agent, or Firm—Niro, Scavone, Haller, Niro & Rockey, Ltd.

[57] ABSTRACT

A monitor and governor circuit provides speed control for an engine. The governor portion of the circuit, principally a PID controller, includes a fail safe circuit to shut the engine down in the absence of signals related to engine RPM. In addition, the governor includes a high gain feature operable during start up to keep the integrator from saturating. The speed monitor portion of the circuit prevents engine damage in the event that the speed governor should fail as, for example, due to a shorted output transistor or an open speed setting potentiometer. The end user is not required to set the speed monitor since it can be preset to a selected percent of the governor set speed.

6 Claims, 2 Drawing Sheets

ENGINE CONTROL CIRCUIT INCLUDING SPEED MONITOR AND GOVERNOR

BACKGROUND OF THE INVENTION

The present invention relates to control devices for internal combustion engines and particularly small engines. The usual type of controller is a PID controller in which a signal proportional to engine RPM is combined with a derivative signal and an integral signal to generate an error voltage used to regulate a throttle or other engine speed control device.

With particular reference to smaller engines, there is a greater potential for damage to the engine in the event that there is a failure in the control electronics. Indeed, there are several types of failures to be dealt with in order to fully protect the engine from damage. For example, if the magnetic pick up device used to monitor engine RPM, fails, an ordinary speed governor may interpret the absence of such signals as a below set point speed error and, therefore, continually increase engine speed until damage occurs. In reality, such a condition may be nothing more than a broken pickup coil or associated problem. It is necessary, therefore, to provide a fail safe circuit which will not respond in this manner in the absence of magnetic pickup signals.

Similarly, in the event that a governor output transistor becomes shorted, the governor loses its ability to shut down the engine and, again, over speed conditions can occur which will cause damage. A third problem frequently encountered is damage to the potentiometer by which the desired speed reference value is set. If the potentiometer fails, the governor would be provided with an incorrect reference voltage also leading to the engine's damage.

Accordingly, it is desired to provide an improved speed governor circuit and monitor circuit whereby the failures described can be detected and appropriate action taken to prevent damage to the engine.

A further object is to provide circuitry which will automatically employ a percentage of the engine set RPM for the overspeed monitor threshold value.

It is a further object of the invention to provide a PID governor which can have a low gain during normal operation but which provides high gain during start up to prevent saturation of the integrator portion of the governor circuit.

These and other objects and advantages of the invention will be apparent from the remaining portion of the specification.

SUMMARY OF THE INVENTION

A control circuit is disclosed including a speed governor and speed monitor. The governor includes fail safe logic to detect the absence of a magnetic pick up signal. Such absence appears to the circuitry as an over speed condition causing the governor to shut down the engine.

During start up the governor feedback elements associated with the proportional and derivative operational amplifier provides high gain and then drop out of the circuit to permit the use of a low gain setting for normal operation.

The speed monitor portion of the circuit provides the capability of detecting an open speed reference potentiometer, monitors engine speed from the magnetic pick up signal and actuates an over speed relay in the event an unsafe condition is detected regardless of the speed governor's operating condition. This protects the engine even in the event that one or more governor output transistors are shorted.

DETAILED DESCRIPTION

Speed Governor

Figure 1:
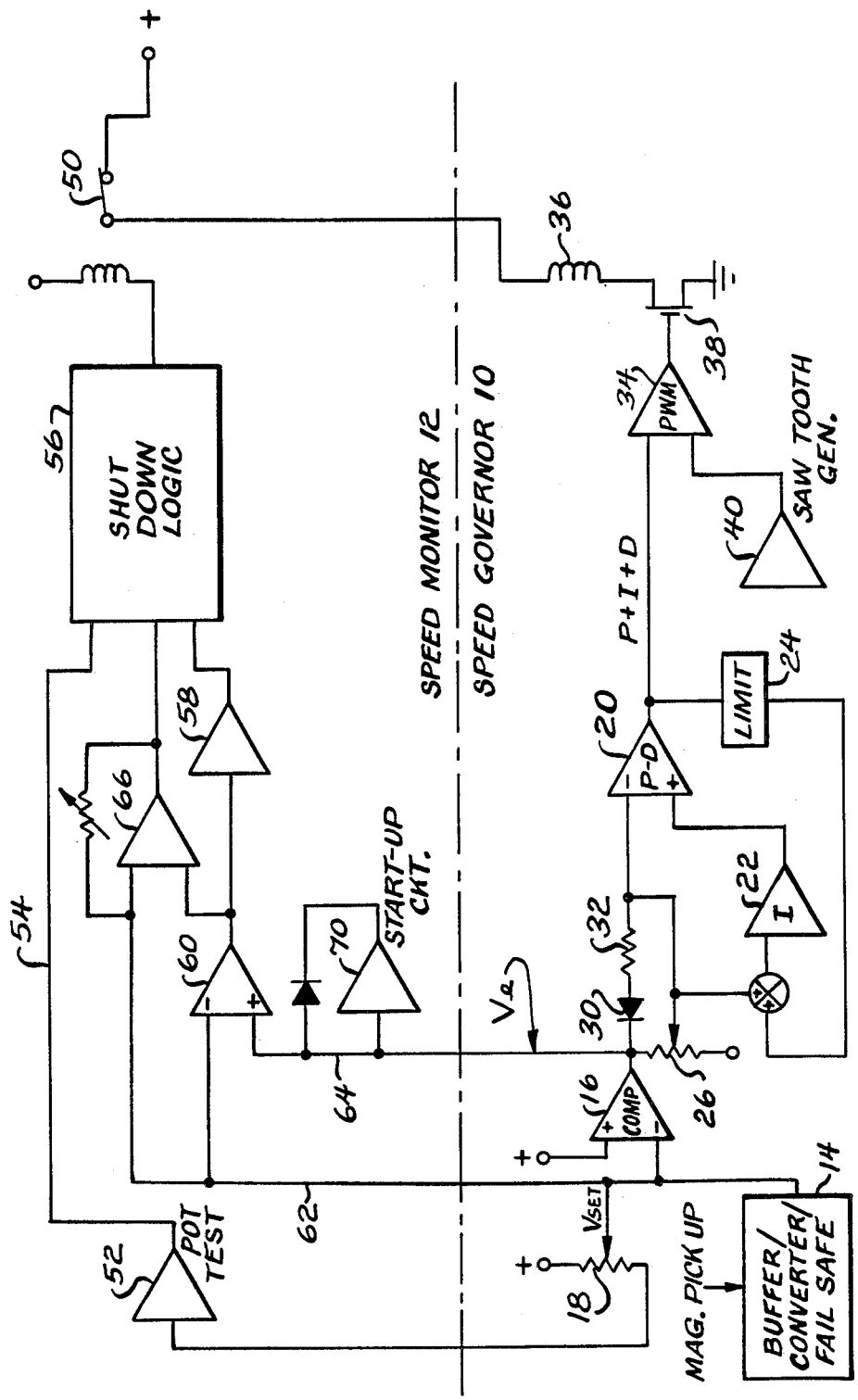
FIG. 1 is a simplified schematic diagram of the invention illustrating the important features thereof.

Referring to FIG. 1, a control circuit is illustrated. The control circuit consists of two sections, a speed governor section 10 and an engine speed monitor section 12. Referring first to the governor section, a magnetic pickup signal is obtained in the usual manner from a shaft encoder or other magnetic pick up device associated with the engine to be governed. As is well known in this art, such a magnetic pickup can produce a waveform (usually sinusoidal), the frequency of which is directly related to engine RPM. The pickup signal is provided to a network 14 which buffers the signal, converts it to a series of DC levels (square waves) and which contains fail safe circuitry to shut down the engine in the absence of a magnetic pickup signal. The details concerning network 14 are described hereafter in connection with FIG. 2. The output of network 14 is provided as one input to a comparator 16, the other (plus) input of which is obtained from a potentiometer 18. Potentiometer 18 is the speed reference potentiometer. Its value determines the speed at which the governor will permit the engine to run during normal operation. The output of the comparator 16 is a voltage, $V_E$ which is the speed error obtained by subtracting the run voltage, $V_{RUN}$ from the set point voltage $V_{SET}$. $V_E$ is normally equal to zero when the engine running speed is equal to the set speed.

The speed error signal, $V_E$ is operated on by the PID section, including operation amplifiers 20 and 22, in a manner well known in this art. Specifically, the proportional and derivative of $V_E$ are combined with the integral of the signal from amplifier 22. When the error signal is zero, the output of the amplifier 20 is forced to zero. If the output amplifier 20 is not zero, it is indicative of a speed error. This output is a DC voltage. It is used to limit the integrator 22 by means of the limit network 24 to keep the integrator in a desired operating region. This prevents saturation of the integrator while permitting the use of a low gain response for the governor to insure precise operation. The PID gain is set by a potentiometer 26.

A significant feature of the present invention is the ability to alter the PID gain during engine start up. During such start up it is desired to provide a high gain so that the circuit can quickly adjust the engine speed to the desired set point. This is accomplished by means of diode 30 and resistor 32 connected between the input of the amplifier 20 and the output of amplifier 16. These components produce a large PD gain whenever there is a large error signal (at least 10-20%). With error signals of 10 to 20%, this combination causes the gain to go very high as is desired during engine start up. This result obtains only during a start up condition due to the polarity of the speed error signal under these circumstances.

Specifically, if the engine is stopped and the speed governor calls for a normal operating speed, a large error signal $V_E$ will be present and of a polarity to cause diode 30 to conduct through the resistor 32. This parallels resistor 32 with the potentiometer 26 providing a high gain input to the PD amplifier 20 permitting the engine to quickly reach set point operating speed.

This is desirable from a user's point of view in two respects: the engine quickly reaches the desired operating speed and the integrator 22 is prevented from reaching saturation during start up. Of course, once operating speed has been reached, the error signal goes to zero or changes polarity (if overshoot occurs) and the diode and resistor combination drop out of the circuit permitting the gain to be controlled solely by the setting on potentiometer 26. The increased PD gain during start up is effective to hold the integrator low until the engine is within 10 to 20% of engine set speed and. This prevents saturation of the integrator 22 which in turn results in reduced engine overshoot on start up even with a very low gain setting. In the absence of this high gain start up circuit, it is typical to expect 25 to 50% overspeed due to the temporary saturation of the integrator reducing the accuracy of the controller.

The output of PD amplifier 20, the PID signal, is provided to operational amplifier 34 which generates a pulse width modulated voltage to supply coil current to an actuator coil 36 via a series of output transistors, one of which is shown at 38. The PID output is supplied as one input to the comparator 34 while a saw tooth voltage from a saw tooth generator 40 is provided as the other input. In a typical embodiment the saw tooth voltage has a frequency of approximately 200 Hertz. The comparator 34 converts the linear, DC positioning voltage of the (PID signal) to an on/off voltage which is duty cycle controlled. This allows the use of switched actuator coil 36 rather than a linearly operated coil greatly reducing power dissipation in the output transistors which, in a preferred embodiment, are FETS.

Speed Monitor

The upper portion of FIG. 1 illustrates the engine speed monitor portion of the circuit. The monitor controls operation of an over speed relay 50 which, in turn, can deenergize coil 36 any time that engine running speed exceeds engine set speed by a selected percentage, for example, 5 to 20%. Because the speed monitor utilizes signals from the governor portion of the circuit, integrity checks are made by the monitor to insure that no fault conditions exist which could impair its function. A first check is of the set speed potentiometer 18. This is accomplished by an amplifier 52 which looks for an open potentiometer. If this condition exists, engine speed would, theoretically, be set to infinity and, therefore, the monitor could never conclude that there was an over speed condition extant. Should the amplifier 52 detect an open potentiometer the over speed relay 50 is operating via line 54 and the logic indicated generally at 56 to be described hereafter.

A second check is made to insure that the engine run voltage, $V_{RUN}$ is available. Specifically, a test on the cranking speed level of the engine is performed. If, during cranking, no run voltage is detected, then the engine speed monitor relay 50 does not close. This prevents the engine from starting and is an additional guard against operating with a defective pickup device. The run test is performed by amplifier 58 which must be properly biased during engine start up in order to pull the over speed relay in. As will be described presently, if running voltage is detected on start up, amplifier 60 will produce the necessary signal for amplifier 58 which, in turn, will pull in the relay 50.

The inputs to amplifier 60 are $V_{SET}$ on line 62 and $V_E$ on line 64. Amplifier 60 produces an output voltage $K*V_{RUN}$. This output is generated by summing the engine set speed ($V_{SET}$) with engine speed error ($V_E$). The output of amplifier 60, is linearly proportional to engine running speed. The constant, K is adjustable and determined by a voltage divider network. This permits its value to be set between, for example, 5% and 20% of engine set speed. This produces an auto ranging over speed function. Whenever the set speed is changed on potentiometer 18, the over speed function of amplifier 60 is automatically calculated as a percentage of engine set speed.

The output of amplifier 60 is compared by amplifier 66 to the set speed $V_{SET}$. If the output from amplifier 60 ($K*V_{RUN}$) exceeds the engine set speed ($V_{SET}$), the output of amplifier 66 will cause the over speed relay 50 to drop out via the shut down logic 56. As is apparent, the failure of anyone of the three conditions indicated in the shut down logic can cause the over speed relay to drop out (or not close in the case of Amp 58) causing the engine to stop.

Amplifier 70 is used to allow initial engine start up without tripping amplifier 66. Without amplifier 70, amplifier 66 would see a condition where the output of amplifier 60 was greater than the set voltage and prevent the engine from starting.

Thus, the circuit according to the prevent invention provides precise effective control of a small engine and does so with greater safety than has heretofore been obtainable in the prior art.

Figure 2:
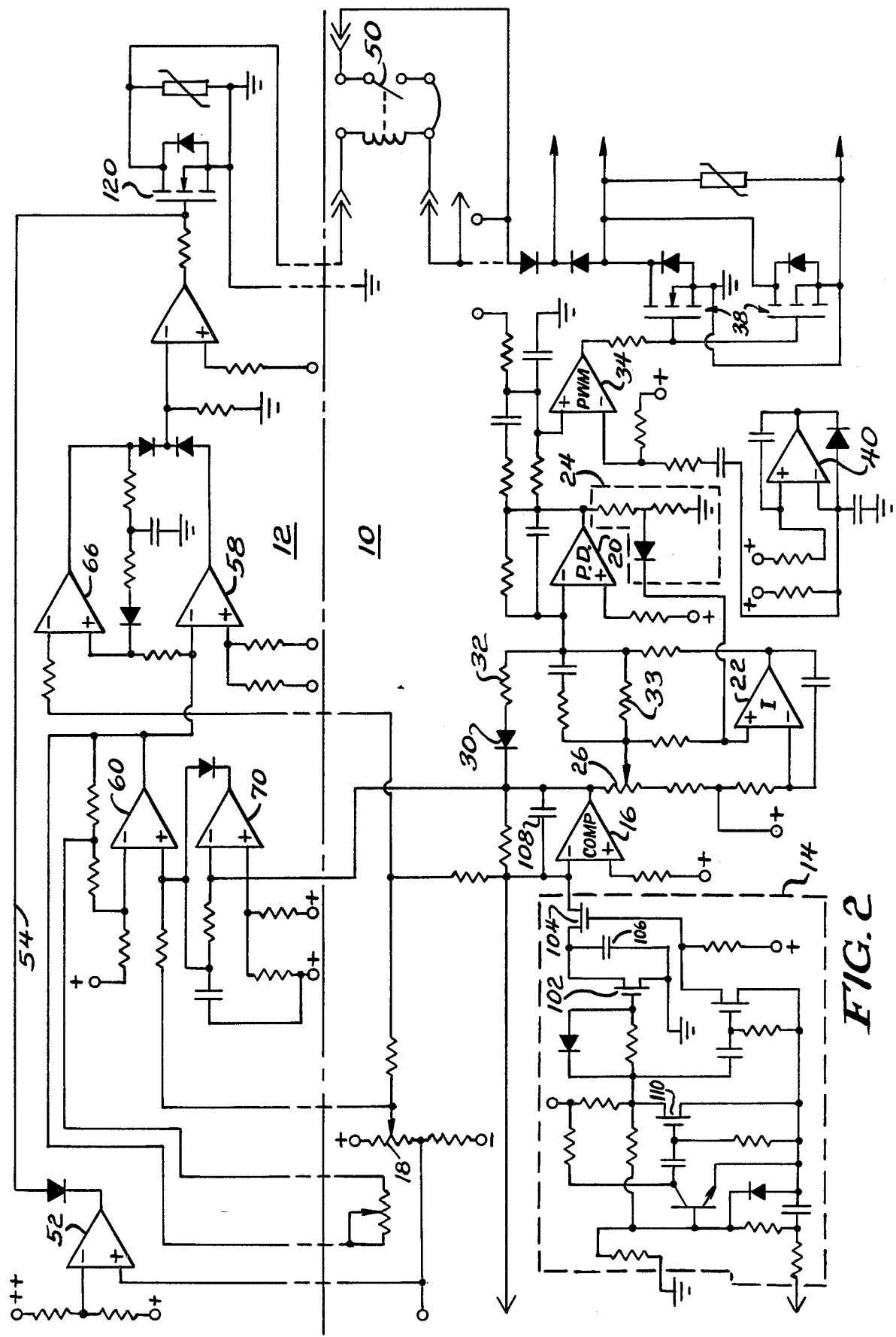
FIG. 2 is a detailed schematic of the invention showing the circuitry in detail.

Referring to FIG. 2, a detailed schematic of the invention is illustrated. Because the simplified schematic describes the essential features of the invention in sufficient detail to enable one skilled in the art to understand it, the detailed schematic will be referenced only with respect to those portions which require a detailed explanation to insure complete familiarity with their operation. The buffering and conversion of the magnetic pick up frequency to square waves is accomplished by the circuitry contained within the box 14. This circuitry is simply buffering and pulse shaping circuitry, the operation of which is well known in the art. The square wave output is provided to the negative input of operational amplifier 16 configured as a comparator.

The fail safe portion of block 14 particularly involves FET transistors 102, 104 and capacitor 106. As can be observed, one side of capacitor 106 is connected to ground while the other side is connected between the gates of the FET transistors. Capacitor 106 charges up during one-half cycle when transistor 104 is conducting. On the next half cycle transistor 104 is off while transistor 102 is on. At this time capacitor 106 is grounded and discharges. Thus, during normal operation the capacitor 106 charges and discharges every cycle and the changing state of capacitor 106 is transferred or "pumped" capacitor 108, disposed in the feedback loop of amplifier 16.

In the event that no signal is detected from the magnetic pick up, FET transistor 110 will remain off. In turn, transistor 102 will remain on, continuously grounding capacitor 106. When transistor 104 turns on, amplifier 16 is grounded causing is to saturate simulating a gross over speed condition. This, in turn, causes the balance of the PID circuit to shut down the engine, accomplishing the desired result. Restated, in the absence of a magnetic pick up signal, the circuit will prevent engine damage due to a possible over speed condition by shutting off the engine.

Referring to the central portion of FIG. 2, the PD amplifier 20 is illustrated. As previously indicated during normal operation, the gain potentiometer 26 is set to provide a relatively low gain for the amplifier 20 to permit precision control of engine speed. During start up, however, to obtain high gain to avoid saturation of the integrator amplifier 22, resistor 32 is switched in parallel with the resistor 33 by the diode 30.

Referring to the lower right hand portion of FIG. 2, the output of the pulse width modulation comparator 34 is provided to a number of FET output transistors which are connected to the actuator coil for engine control. The over speed relay 50 controls the voltage to the coil permitting the latter to be disabled by the speed monitor should that be necessary.

Referring to the upper portion of FIG. 2, the detailed schematic of the speed monitor is illustrated. Because the description provided in connection with FIG. 1 is sufficient for an understanding of the circuit, it is necessary only to examine the logic represented by box 56. As may be seen, either of two conditions (open potentiometer 18 or over speed) can switch off the gate array 120 causing the relay 50 to drop out disabling the coil. Similarly if the amplifier 58 does not detect a run signal during initial cranking of the engine, array 120 will never pull in relay 50, preventing the engine from starting.

While I have shown and described embodiments of the invention, it will be understood that this description and illustrations are offered merely by way of example, and that the invention is to be limited in scope only as to the appended claims.

What is claimed is:

1. A control circuit for an internal combustion engine comprising:
    (a) buffer means receiving a signal related to engine RPM (the RPM signal) and producing a buffered signal proportional thereto;
    (b) a PID governor circuit for receiving and comparing the buffered signal against a reference signal to control the speed of said engine as a result of said comparison, said PID governor circuit including:
        (i) operational amplifiers receiving said buffered signal for producing an error signal and a proportional (P), integral (I), and a derivative (D) of said error signal, the P, I, D signals being combined to produce a signal for controlling engine speed; and
        (ii) means for providing high gain for the operational amplifiers producing the P and D signals during engine start up to permit the engine to quickly reach normal operating speed and avoid saturation of the operational amplifier producing the I signal.

2. A control circuit according to claim 1 wherein said PID governor circuit includes means for providing high gain during engine start up to permit the engine to quickly reach normal operating speed.

3. A control circuit according to claim 1 wherein said fail safe circuit means includes means for grounding the input to said PID governor circuit in the absence of the RPM signal.

4. A control circuit in accordance with claim 1 further including a speed monitor circuit for detecting fault conditions and shutting down the engine, said speed monitor circuit including:
    (a) means for detecting the absence of the RPM signal during engine start up;
    (b) means for detecting a faulty reference signal.

5. A control circuit for an integral combustion engine comprising:
    (a) buffer means receiving a signal related to engine RPM (the RPM signal) and producing a buffered signal proportional thereto;
    (b) a PID governor circuit for receiving and comparing the buffered signal against a reference signal to control the speed of said engine as a result of said comparison;
    (c) said buffer means including fail safe circuit means for causing said PID governor circuit to shut down the engine if no RPM signal is detected; and
    (d) a speed monitor circuit for shutting down the engine upon detecting an overspeed condition in which the buffered signal exceeds said reference signal by a selectable percentage.

6. A control circuit for an internal combustion engine comprising:
    (a) buffer means receiving a signal related to engine RPM (the RPM signal) and producing a buffered signal proportional thereto;
    (b) a PID governor circuit for receiving and comparing the buffered signal against a reference signal to control the speed of said engine as a result of said comparison;
    (c) said buffer means including fail safe circuit means for causing said PID governor circuit to shut down the engine if no RPM signal is detected; and
    (d) a speed monitor circuit for shutting down the engine upon detecting an overspeed condition in which the buffered signal exceeds said reference signal by a selectable percentage said speed monitor circuit further includes:
        (i) means for detecting the absence of the RPM signal during start up; and
        (ii) means for detecting a faulty reference signal.

* * * * *